US009720444B2

(12) United States Patent
Holden (10) Patent No.: US 9,720,444 B2
(45) Date of Patent: Aug. 1, 2017

(54) FURNITURE SYSTEM FOR COMPUTER SYSTEM HAVING INTEGRAL DISPLAY (71) Applicant: Ryan Nicholas Holden, Barrie (CA)

(72) Inventor: Ryan Nicholas Holden, Barrie (CA)

(*) Notice: Subject to any disclaimer, the term of this patent is extended or adjusted under 35 U.S.C. 154(b) by 37 days.

(21) Appl. No.: 14/665,041

(22) Filed: Mar. 23, 2015

(65) Prior Publication Data
US 2016/0282908 A1 Sep. 29, 2016

(51) Int. Cl.
H05K 7/00 (2006.01)
H05K 5/00 (2006.01)
G06F 1/16 (2006.01)
F16M 11/00 (2006.01)
G06F 1/18 (2006.01)

(52) U.S. Cl.
CPC ........... *G06F 1/1637* (2013.01); *F16M 11/00* (2013.01); *G06F 1/181* (2013.01)

(58) Field of Classification Search
CPC ........................................................ G06F 1/16
USPC ..................................................... 361/679.21
See application file for complete search history.

(56) References Cited

U.S. PATENT DOCUMENTS

| 5,174,223 A | 12/1992 | Nagy |
| 6,094,341 A | 7/2000 | Lin |
| 6,102,476 A | 8/2000 | May |
| 6,493,220 B1 | 12/2002 | Clark et al. |
| D474,920 S | 5/2003 | Holt |
| 6,883,439 B1 | 4/2005 | Moore |
| D510,821 S | 10/2005 | Madison |
| 7,063,024 B2 | 6/2006 | Latino |
| 7,490,837 B2 | 2/2009 | Pond et al. |
| 8,051,782 B2 | 11/2011 | Nethken et al. |
| D652,229 S | 1/2012 | Madison |
| 8,215,650 B2 | 7/2012 | Areeta et al. |
| 8,749,959 B2 | 6/2014 | Riley et al. |
| 8,826,830 B2 | 9/2014 | Pajic |
| 2003/0230222 A1 | 12/2003 | Liu |
| 2007/0214297 A1 | 9/2007 | Gilbert |
| 2009/0154079 A1* | 6/2009 | Bae ........................ A47B 21/00 361/679.02 |
| 2012/0229970 A1 | 9/2012 | Hsu |
| 2012/0248263 A1 | 10/2012 | Grotenhuis |
| 2013/0093220 A1* | 4/2013 | Pajic ........................ A47C 7/70 297/163 |

FOREIGN PATENT DOCUMENTS

CN 103222734 7/2013

* cited by examiner

*Primary Examiner* — Jerry Wu
(74) *Attorney, Agent, or Firm* — Guiseppe Mariconda

(57) ABSTRACT

A furniture system is for a computer system having an integral display. The furniture system includes a base section. A computer-peripheral section is configured to extend from the base section. The computer-peripheral section presents a built-in computer-peripheral having built-in computer-peripheral wiring configured to interface with the computer system. A computer-support section presents a fixedly-attached computer-mounting mechanism configured to couple with the computer system in such a way that the integral display faces the user of the computer system. The computer-support section is configured to move relative to the computer-peripheral section in such a way that the integral display of the computer system and the computer system are movably positionable at selected user-display positions.

19 Claims, 10 Drawing Sheets

FURNITURE SYSTEM FOR COMPUTER SYSTEM HAVING INTEGRAL DISPLAY

TECHNICAL FIELD

Some aspects generally relate to (and are not limited to) a furniture system for a computer system having an integral display.

BACKGROUND

The computer desk is designed to provide a working surface and house or conceal a computer, peripherals and/or cabling (for office users and/or home-office users).

SUMMARY

It will be appreciated that there exists a need to mitigate (at least in part) at least one problem associated with existing computer desks (computer furniture). After much study of the known systems and methods with experimentation, an understanding of the problem and its solution has been identified and is articulated as follows:

Some existing computer tables are configured to support a computer having an integral display and to orient the integral display of the computer in a horizontal configuration (orientation). The computer table does not offer a user selectable position for the integral display of the computer and/or does not accommodate users of various heights or vertical orientations conditions required by a user to view the integral display of the computer.

What is needed is a computer desk (also called, computer furniture) that supports a computer having an integral display in such a way that user-orientation of the integral display of the computer is improved (in such a way to accommodate the user requirements for using the integral display of the computer and/or to suit user access requirements to the integral display).

To mitigate, at least in part, at least one problem associated with existing computer desks (computer furniture), there is provided (in accordance with a major aspect) a furniture system. The furniture system is for a computer system having an integral display and for a user of the computer system. The furniture system includes (and is not limited to) a base section. A computer-peripheral section is configured to extend from the base section. The computer-peripheral section presents a built-in computer-peripheral having built-in computer-peripheral wiring configured to operatively interface with the computer system having the integral display. A computer-support section is configured to present a computer-mounting mechanism configured to couple with the computer system having the integral display in such a way that the integral display, in use, faces (in use or as installed) the user of the computer system. The computer-support section is configured to move relative to the computer-peripheral section in such a way that the integral display of the computer system and the computer system are movably positionable at selected user-display positions.

To mitigate, at least in part, at least one problem associated with existing computer desks (computer furniture), there is provided (in accordance with a major aspect) a furniture system. The furniture system is for a computer system having an integral display and for a user of the computer system. The furniture system includes (and is not limited to) a base section configured to support a built-in power cord configured to provide power to the computer system having the integral display once the built-in power cord is operatively coupled to the computer system. A computer-peripheral section is configured to extend from the base section. The computer-peripheral section presents a built-in computer-peripheral having built-in computer-peripheral wiring configured to operatively interface with the computer system having the integral display once the built-in computer-peripheral wiring is operatively coupled to the computer system. A computer-support section is configured to present a fixedly-attached computer-mounting mechanism configured to couple with, support and position the computer system having the integral display. This is done in such a way that the integral display of the computer system, in use or as installed, spatially faces away from the computer-support section and towards the user of the computer system having the integral display once the user is positioned to face the integral display of the computer system. The computer-support section is movably coupled to the computer-peripheral section. The computer-support section is configured to move relative to the computer-peripheral section in such a way that the integral display of the computer system and the computer system are movably positionable at selected user-display positions once the computer-support section is made to move relative to the computer-peripheral section.

The furniture gives the user a flexible way to view the integral display of the computer (to suit spatial orientations of the integral display for various user needs).

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED
IN THE DRAWINGS 100 furniture system
102 base section
104 built-in power cord
105 projector assembly
106 computer-peripheral section
108 built-in computer-peripheral
110 built-in computer-peripheral wiring
112 computer-support section
114 fixedly-attached computer-mounting mechanism
200 wheel or wheels
202 leg or legs
204 height-control assembly
206 vertical-height adjustment assembly
208 access port
210 angular-alignment control assembly
212 guide mechanism
214 slot or slots
216 keyboard
218 speaker system
220 mouse track pad
222 handle
224 memory interface device
226 audio port
228 arrow
230 slide channel
900 computer system
902 integral display
904 user

DETAILED DESCRIPTION OF THE
EXEMPLARY EMBODIMENTS

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIGS. 1A, 1B, 1C, 1D, 1E and 1F depict views of embodiments of a furniture system 100. FIGS. 1A, 1B, 1C, 1D, 1E and 1F depict perspective views of the embodiments of the furniture system 100.

With reference to all of the FIGS., and with specific reference to FIGS. 1A, 1B, 1C, 1D, 1E and 1F, the furniture system 100 is for a computer system 900 and for a user of the computer system 900. The computer system 900 includes (or has) an integral display 902.

Figures 1A, 1B, 1C:
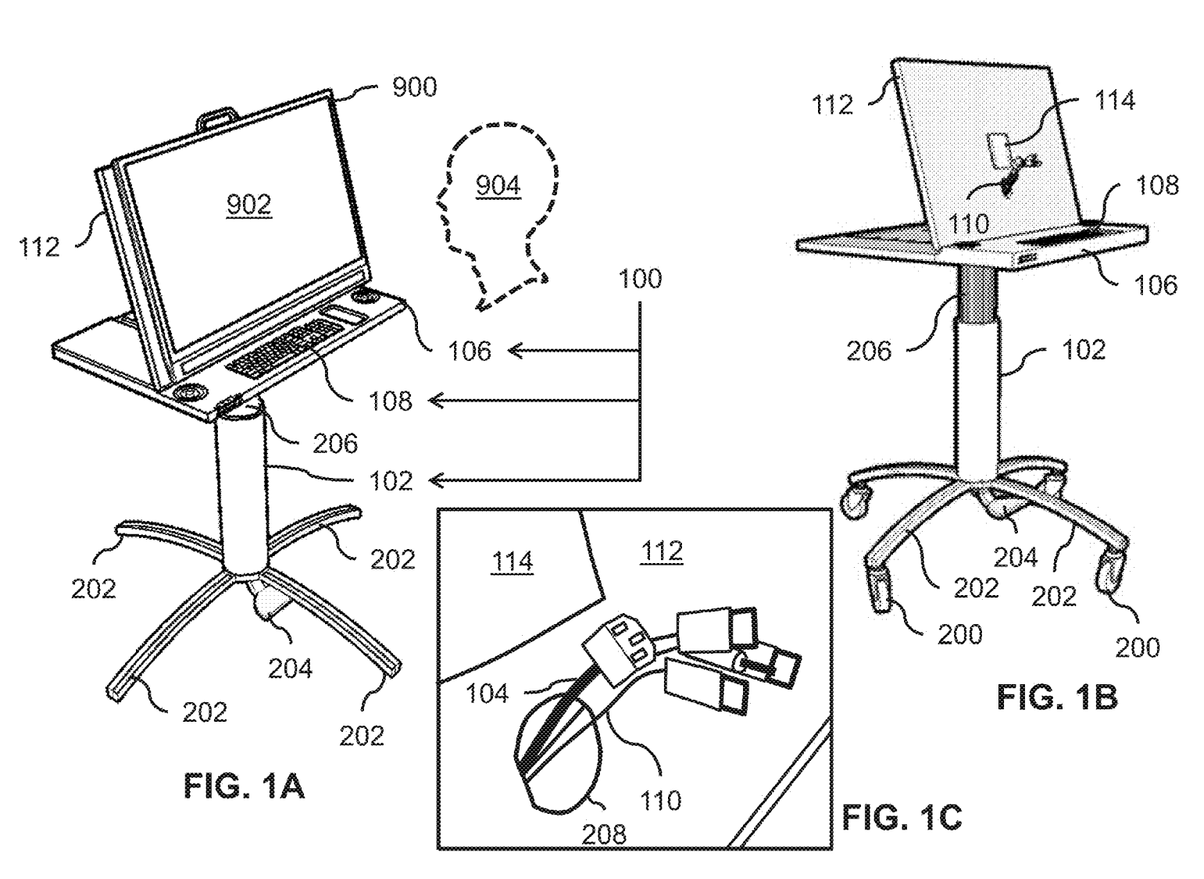
FIGS. 1A, 1B, 1C, 1D, 1E and 1F (SHEETS 1 and 2 of 10 SHEETS) depict views of embodiments of a furniture system.

Referring specifically to the embodiment depicted in FIG. 1A, the computer system 900 (also called an all-in-one computer) is a computer system that integrates a monitor (such as, the integral display 902) and main computer components in one unit. The computer system 900 may require an external power source and separate keyboard and/or mouse. More specifically, the computer system 900 integrates internal components into the same case (also called a housing assembly) as the display (monitor), thereby eliminating some connecting cables and allowing for a smaller footprint, sometimes giving a degree of portability, compared to the standard desktop configuration of the separate display monitor and a system case (housing). The computer system 900 may still require an external power supply. The computer system 900 may be deployed on a table or a desk to use the keyboard and/or the mouse (still separate from the computer system 900, unless the operating system of the computer system 900 provides a touch sensitive display for the user). The computer system 900 may rely on power supplied by a rechargeable battery (if desired). In accordance with a preferred embodiment, the furniture system 100 is configured (preferably) to accommodate the integral displays 902 that range in size from about 14 inches to about 40 inches. The furniture system 100 is configured to facilitate swapping out (replacing) the computer system 900 for an upgraded version of the computer system 900 (without the need to replace the furniture system 100), or for an entirely new instance of the computer system 900.

The furniture system 100 includes (and is not limited to) a combination of a base section 102, a computer-peripheral section 106, and a computer-support section 112.

The base section 102 is configured to be any one (either one) of movable and stationary. FIG. 1A depicts the embodiment in which the base section 102 is configured to be stationary; specifically, the base section 102 includes the legs 202 extending from the base section 102, and the legs 202 are configured to make direct contact with the working surface or the floor. FIG. 1B depicts the embodiment in which the base section 102 is configured to be movable (that is, the base section 102 includes a set of wheels 200 operatively mounted to the legs 202 extending from the base section 102).

Figures 6A, 6B:
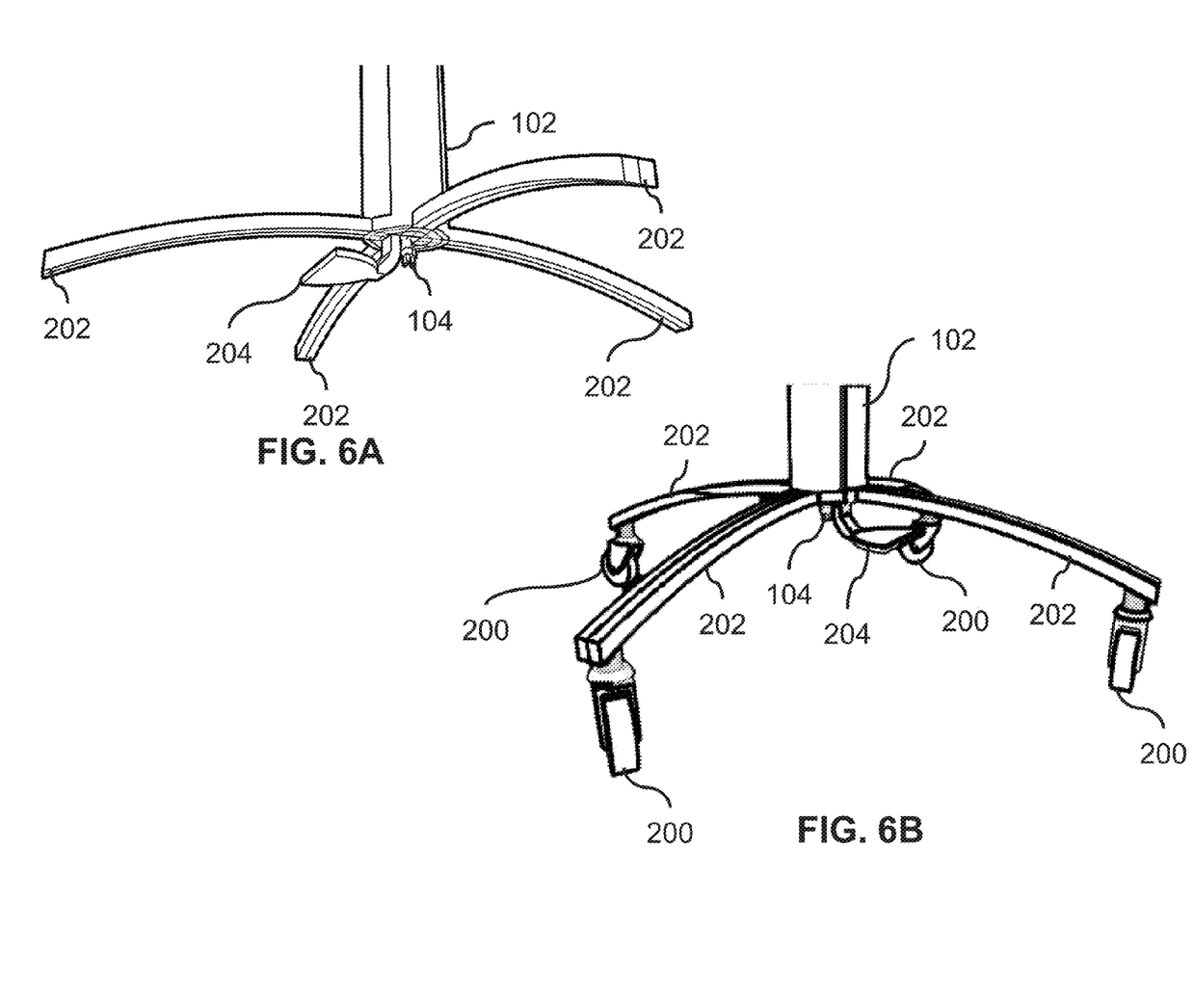
FIGS. 6A and 6B (SHEET 8 of 10 SHEETS) depict views of the embodiments of the furniture system of any one of FIGS. 1A, 1B, 1C, 1D, 1E and 1F.

The base section 102 is configured to support (provide) a built-in power cord 104 (as depicted in FIG. 6A. The built-in power cord 104 is configured to provide power to the computer system 900 (depicted in FIG. 1A) having the integral display 902 once the built-in power cord 104 is operatively coupled to the computer system 900. By way of example, the built-in power cord 104 may be configured to retract when not required to supply power to the computer system 900.

The computer-peripheral section 106 is configured to extend from the base section 102. The computer-peripheral section 106 is supported by the base section 102. The computer-peripheral section 106 presents a built-in computer-peripheral 108. The built-in computer-peripheral 108 may include any type of computer-peripheral device (such as, a user input device, a keyboard and/or a computer port, etc.).

Referring to the embodiment depicted in FIGS. 1B and 1C, the built-in computer-peripheral 108 has built-in computer-peripheral wiring 110. The built-in computer-peripheral wiring 110 is configured to operatively interface with the computer system 900 (depicted in FIG. 1A) having the integral display 902 (that is, once the built-in computer-peripheral wiring 110 is operatively coupled to the computer system 900).

The computer-support section 112 is configured to present (provide) a fixedly-attached computer-mounting mechanism 114. In accordance with a preferred embodiment, the fixedly-attached computer-mounting mechanism 114 includes a VESA mount (Video Electronics Standards Association mount) that complies with the VESA Mounting Interface Standard (MIS) as defined by the Video Electronics Standards Association. The fixedly-attached computer-mounting mechanism 114 is fixedly attached to the computer-support section 112. The fixedly-attached computer-mounting mechanism 114 is configured to: (A) couple with (fixedly attach or selectively detachably attach) the computer system 900 having the integral display 902, and (B) support and position the computer system 900 having the integral display 902. This is done in such a way that the integral display 902 of the computer system 900 spatially faces away from the computer-support section 112, and faces towards the user 904 (as depicted in FIG. 1A) of the computer system 900 (once the user 904 is positioned to face the integral display 902 of the computer system 900). In accordance with a preferred embodiment, the furniture system 100 is configured to accommodate many types (form factors) of the computer system 900 that provide a support assembly (such as a VESA adapter support device, etc.).

The computer-support section 112 is movably coupled to the computer-peripheral section 106. The computer-support section 112 is configured to move relative to the computer-peripheral section 106. This is done in such a way that the integral display 902 of the computer system 900 and the computer system 900 are movably positionable at selected user-display positions (one such position is depicted in FIG. 1A) once the computer-support section 112 is made to move relative to the computer-peripheral section 106. Therefore, for the case where the user 904 decides to sit in a chair, the user may adjust the position of the computer-support section 112 in such a way that the user 904 may comfortably view the integral display 902 of the computer system 900. For the case where the user 904 decides to stand, the user may adjust the computer-support section 112 accordingly (so that the user may view the integral display 902 at a comfortable position). In this sense, the furniture system 100 may improve (at least in part) the ergonomic fit between the user 904 and the integral display 902 of the computer system 900.

Referring to the embodiment depicted in FIG. 1A, the base section 102 includes a height-control assembly 204. The height-control assembly 204 is configured to actuate a vertical-height adjustment assembly 206, and the vertical-height adjustment assembly 206 is operatively connected to the computer-peripheral section 106. The height-control assembly 204 is configured to actuate a vertical-height adjustment assembly 206 (depicted in FIG. 1B). The vertical-height adjustment assembly 206 may include, for instance, a pneumatic-piston and any equivalent thereof. The vertical-height adjustment assembly 206 is operatively connected to the computer-peripheral section 106. The vertical-height adjustment assembly 206 is configured to move (translate) the computer-peripheral section 106 along a vertical direction (vertical orientation or an up and down direction) relative to the working surface (such as, the floor). The vertical-height adjustment assembly 206 is configured to telescopically move the computer-peripheral section 106 along a vertical alignment. In accordance with a preferred embodiment, the vertical-height adjustment assembly 206 is configured to accommodate adjustable height (vertical adjustment) for multiple user-viewing positions and user-task requirements. The vertical-height adjustment assembly 206 (also called an elevating mechanism) uses a gas piston similar to what is found in an office chair; however, a mechanical lock with a manual lift may be utilized in an alternative embodiment (if so desired).

In accordance with a preferred embodiment, the computer-peripheral section 106 provides, at least in part, a table top surface to the user 904 (the computer-peripheral section 106 appears as a table top surface).

In accordance with a preferred embodiment, the base section 102 includes a central cylindrical support post that is positioned centrally underneath the computer-peripheral section 106. Legs 202 extend radially from a bottom portion of the base section 102. The legs 202 are spaced apart from the computer-peripheral section 106, with the computer-peripheral section 106 centrally positioned above the legs 202. A height-control assembly 204 is positioned at the base portion of the base section 102. The height-control assembly 204 (such as, a foot pedal control) is configured to initiate the raising and/or the lowering of the height of the computer-peripheral section 106. In accordance with a preferred embodiment, the vertical-height adjustment assembly 206 is configured to provide 12 inches of vertical travel for the computer-peripheral section 106.

The computer-peripheral section 106 and the computer-support section 112 are configured (in combination) to provide (give) user positioning options for the spatial positioning of the computer system 900. For instance, the height of the computer system 900 (once mounted to the computer-support section 112) is adjustable from about 2.5 feet to about 3.5 feet, and/or the angled orientation of the integral display 902 may be modified to travel from about zero degrees to about 75 degrees (relative to the horizon or the floor). The positional height of the computer system 900 is adjustable through the vertical-height adjustment assembly 206 (also called a centre mounted gas piston) positioned or mounted in the base section 102 (also called a cylindrical base). The height-control assembly 204 (located the base of the base section 102) is configured to accommodate vertical orientation (height). With an application of a down force (a gentle downward force) on the computer-peripheral section 106 (also called a table top), the user is allowed to lower the computer-peripheral section 106 (as may be required or desired).

The computer-support section 112 is configured to be spatially oriented (elevation adjustment and/or angled or pivoted adjustment) relative to the user 904. The furniture system 100 gives the user 904 flexibility over orientations of the integral display 902 of the computer system 900 (to satisfy the spatial orientation requirements of a user). For instance, the computer-support section 112 and/or the computer-peripheral section 106 offer a drafting position, a desk position, etc.

Referring to the embodiment depicted in FIG. 1B, the computer system 900 of FIG. 1A has been removed so that a view of the fixedly-attached computer-mounting mechanism 114 is exposed. The computer system 900 of FIG. 1A is configured to operatively connect with the fixedly-attached computer-mounting mechanism 114 (in a secured stationary position) relative to the computer-support section 112. In accordance with a preferred embodiment, a wheel 200 is mounted to each distal end of each leg 202 (for improved mobility of the furniture system 100); the wheel 200 may include a castor type wheel.

Referring to the embodiment depicted in FIG. 1C, a close-up view of the computer-support section 112 is provided for the computer-support section 112 depicted in FIG. 1B. The computer-support section 112 defines an access port 208. The access port 208 is configured to permit passage of the built-in computer-peripheral wiring 110 through the computer-support section 112 in such a way that the built-in computer-peripheral wiring 110 may be operatively connected to the computer system 900 to be mounted to the fixedly-attached computer-mounting mechanism 114 (as depicted in FIG. 1A). The built-in computer-peripheral wiring 110 may be called a cable bundle.

In the central portion of the computer-support section 112, the computer-support section 112 defines an access port 208 configured to permit passage of the built-in power cord 104 (configured to attach to the computer system 900), as well as the built-in computer-peripheral wiring 110, such as cable extensions for USB (Universal Serial Bus), audio jacks and/or HDMI (High-Definition Multimedia Interface) connections. The built-in computer-peripheral wiring 110 is attachable to the computer system 900 through the access port 208 that is formed in the lower section of computer-support section 112. The other end of the built-in computer-peripheral wiring 110 (also called extenders) is attachable to the built-in computer-peripheral 108 (one or more types of devices) that are built into (integrated with) the computer-peripheral section 106 (preferably behind the second material of the computer-peripheral section 106, such as a PLEXIGLASS (TRADEMARK) material). The access port 208 is configured to accommodate the feeding of the built-in computer-peripheral wiring 110 to the computer-peripheral section 106.

It will be appreciated that the materials used in the computer-peripheral section 106 may include a variety of materials (such as, a non see-through material and/or a see-through material, such as a plastic material, an aluminum alloy, a powder coated steel and/or a glass medium, etc.).

The computer system 900 is attached to the fixedly-attached computer-mounting mechanism 114 provided by the computer-support section 112. Below the fixedly-attached computer-mounting mechanism 114, there is an access port 208 used to feed through the built-in computer-peripheral wiring 110 (needed for the computer system 900).

The built-in computer-peripheral wiring 110 allows enough travel for the computer system 900 to move from a flat orientation to about 75 degrees. Once the built-in power cord 104 and the built-in computer-peripheral wiring 110 are attached to the computer system 900, the computer is mounted to the fixedly-attached computer-mounting mechanism 114.

Figure 1D:
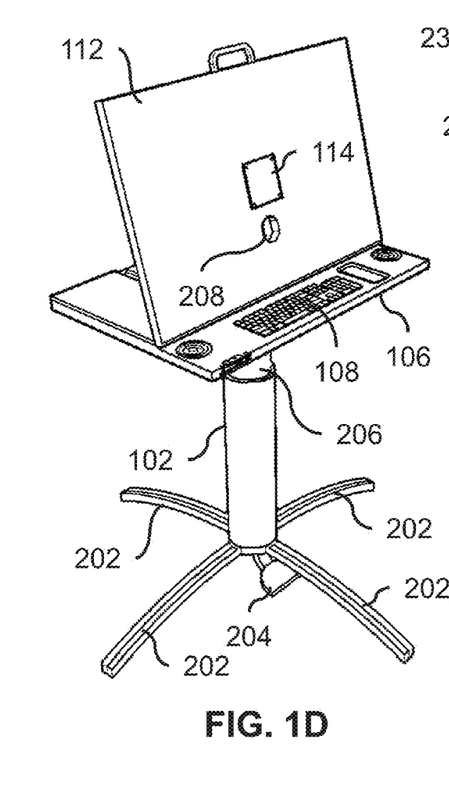

Referring to the embodiment depicted in FIG. 1D, a front section of the computer-support section 112 is depicted. The computer-support section 112 provides the legs 202 extending from the base section 102, and the legs 202 are configured to make direct contact with the working surface. The computer-support section 112 is depicted in an upright position.

In accordance with a preferred embodiment, the computer-peripheral section 106 and the computer-support section 112 are positioned above the base section 102 (in the form of a two-piece table top arrangement). The computer-peripheral section 106 of the table top arrangement includes a first material (such as, a fibreglass composite). The computer-peripheral section 106 incorporates (at least in part) a second material, such as a light-transmittable material configured to face the user 904. The light-transmittable material is configured to face the user 904 and configured to provide, at least in part, a visual view of the built-in computer-peripheral 108. The light-transmittable material may include the PLEXIGLASS (TRADEMARK) material or any transparent (or translucent) thermoplastic that is shatter-resistant. The first material (such as the fibreglass composite) defines slots 214 aligned and set-up in such a way to allow for angled adjustment of the computer-support section 112 relative to the computer-peripheral section 106 (as depicted in FIG. 1F).

In accordance with a preferred embodiment, the computer-support section 112 provides a screw-in system for the fixedly-attached computer-mounting mechanism 114 (such as, the VESA universal mount) for the computer system 900 of FIG. 1A. The are four holes drilled into (formed in) a portion that line ups with the threaded holes on the fixedly-attached computer-mounting mechanism 114. The fixedly-attached computer-mounting mechanism 114 is bolted to one side of the computer-support section 112, and then the fixedly-attached computer-mounting mechanism 114 is coupled to the computer system 900.

Figure 1E:
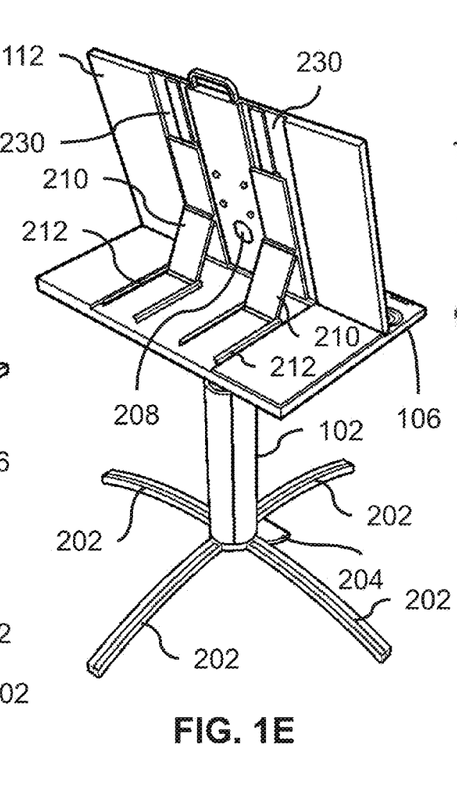

Referring to the embodiment depicted in FIG. 1E, a rear section of the computer-support section 112 is depicted. The computer-support section 112 includes an angular-alignment control assembly 210 configured to adjust the alignment of the computer-support section 112 relative to the computer-peripheral section 106. This is done in such a way that the computer-support section 112 is adjustable to suit the viewing preference of the user 904 (depicted in FIG. 1A) when viewing the computer system 900. The computer-peripheral section 106 provides a guide mechanism 212 configured to slide engage with the angular-alignment control assembly 210.

Figure 1F:
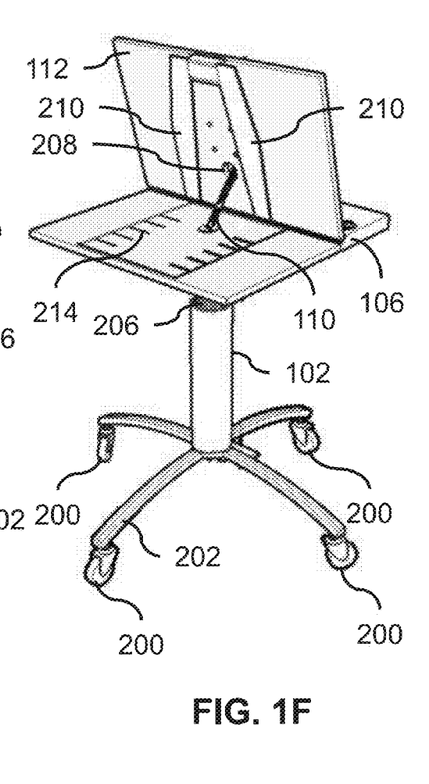

Referring to the embodiment depicted in FIG. 1F, the angular-alignment control assembly 210 is configured to be received (at least in part) in a slot 214 defined by the computer-peripheral section 106. The computer-peripheral section 106 defines a collection of the slots 214 that are spaced apart from each other from the rear portion of the computer-peripheral section 106 extending toward the front portion of the computer-peripheral section 106. The user adjusts the orientation of the computer-support section 112 relative to the computer-peripheral section 106 by selectively positioning the angular-alignment control assembly 210 in a desired instance of the slot 214. As depicted in FIG. 1F, the angular-alignment control assembly 210 engages with the slot 214 (for ease of view of the computer-peripheral section 106).

Figure 2A:
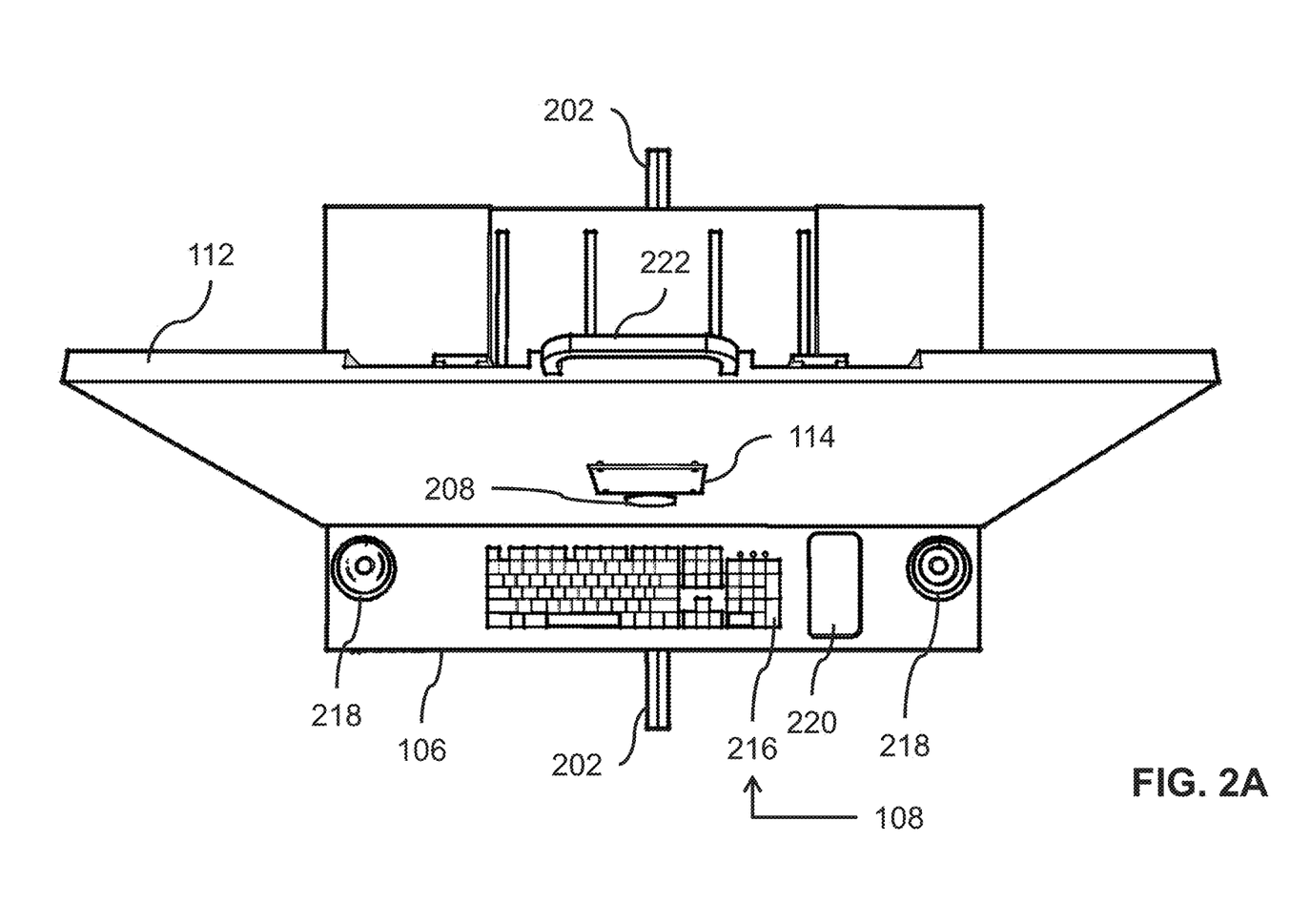
FIGS. 2A and 2B (SHEETS 3 and 4 of 10 SHEETS) depict views of the embodiments of the furniture system of any one of FIGS. 1A, 1B, 1C, 1D, 1E and 1F.
Figure 2B:
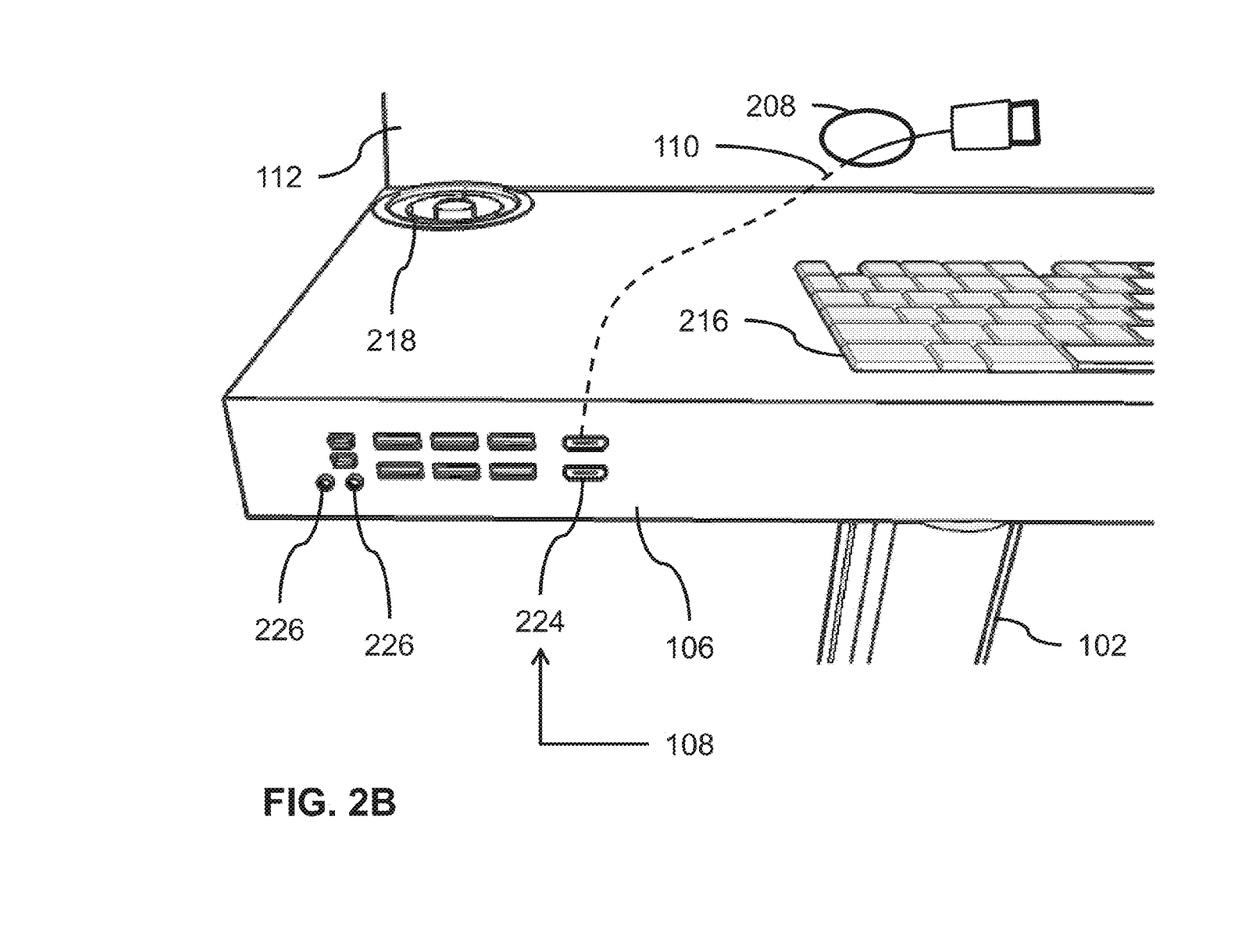

FIGS. 2A and 2B depict views of the embodiments of the furniture system 100 of any one of FIGS. 1A, 1B, 1C, 1D, 1E and 1F. FIG. 2A depicts a top view of an embodiment of the furniture system 100. FIG. 2B depicts a close-up perspective view of an embodiment of the furniture system 100.

Referring to the embodiment depicted in FIG. 2A, the computer-support section 112 is depicted in an inclined position (or an upright position). The computer-support section 112 is movable between various inclined positions (as may be desired by the user 904 of FIG. 1A). The built-in computer-peripheral 108 includes a keyboard 216, a speaker system 218 (positioned on opposite lateral sides of the computer-peripheral section 106 for stereoscopic listening of audio computer files) and/or a mouse track pad 220. The computer-peripheral section 106 may provide a handle 222 extending (edgewise) from an edge section of the computer-support section 112. The user 904 of FIG. 1A may manipulate the orientation or position of the computer-support section 112 by using the handle 222.

The built-in computer-peripheral 108 may include one or more types of devices that are built into (integrated with) the computer-peripheral section 106, preferably behind the second material of the computer-peripheral section 106, such as a PLEXIGLASS (TRADEMARK) material or any shatterproof material that is configured to pass, at least in part, light through in such a way that the user 904 of FIG. 1A may have a partial view of the internal components within the computer-peripheral section 106.

In accordance with a preferred embodiment, a frontal portion of the computer-peripheral section 106 is configured to accommodate and present a QWERTY keyboard to the user 904 (as depicted in FIG. 1A), and other components, such as a wireless charging plate, a touch pad, an HDMI input port, standard audio jacks for headphones and a microphone, a USB port (one or more instances thereof), a micro-USB port (one or more instances thereof), a wireless device, such as a BLUETOOTH (TRADEMARK) card readers, and a speaker (at least one or more instances thereof), etc. The computer-peripheral section 106 has a transparent material or a slightly transparent material to show the internal wiring of the components. The computer-support section 112 is hinge connected to the computer-peripheral section 106.

For instance, an installation CD may be provided with the furniture system 100 configuring the built-in computer-peripheral 108 (such as, a BLUETOOTH (TRADEMARK) card reader) to the computer system 900.

Referring to the embodiment depicted in FIG. 2B, there is depicted a partial close-up view of the computer-peripheral section 106. The built-in computer-peripheral 108 includes a memory interface device 224 (such as, a USB port). The built-in computer-peripheral 108 may also include an audio port 226 (either audio out for headphones or audio in for a microphone). It will be appreciated that many types of computer interfaces may be implemented in the built-in computer-peripheral 108.

With reference to FIG. 2B, the built-in computer-peripheral wiring 110 (also called the cables, and is depicted in FIG. 1C) is positioned within the interior of the computer-peripheral section 106 and is fed through the access port 208 and through the computer-support section 112 (also called the upper table top) and into the computer-peripheral section 106. The built-in computer-peripheral wiring 110 is configured to operatively connect with the built-in computer-peripheral 108 (to one or more computer peripherals) that is mounted (integrated) in the computer-peripheral section 106. The built-in computer-peripheral 108 is, specifically, connected to a front portion of the computer-peripheral section 106 where the keyboard 216 is mounted.

Figure 3A:
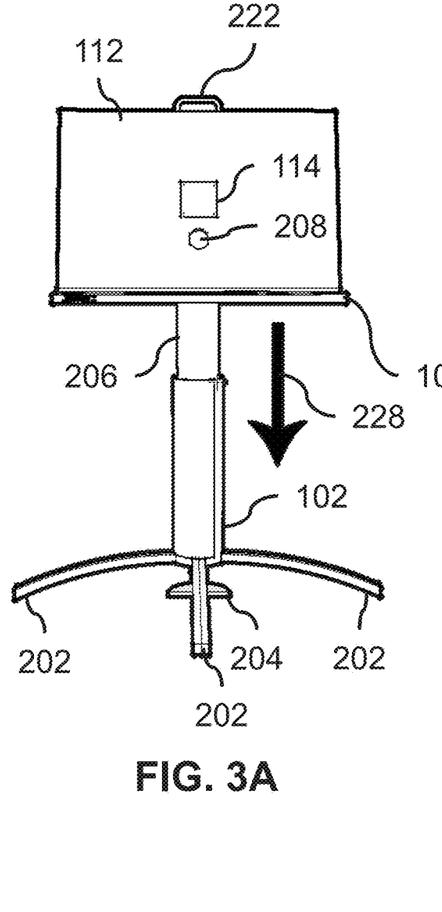
FIGS. 3A, 3B and 3C (SHEET 5 of 10 SHEETS) depict views of the embodiments of the furniture system of any one of FIGS. 1A, 1B, 1C, 1D, 1E and 1F.
Figures 3B, 3C:
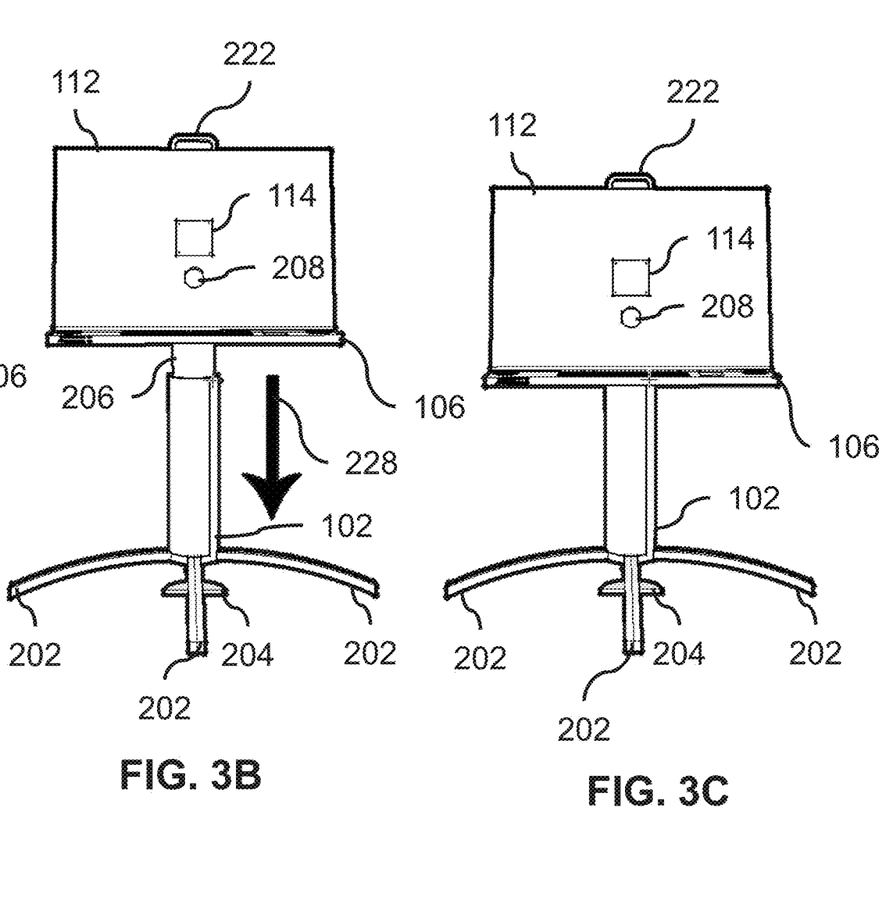

FIGS. 3A, 3B and 3C depict views of the embodiments of the furniture system 100 of any one of FIGS. 1A, 1B, 1C, 1D, 1E and 1F. FIGS. 3A, 3B and 3C depict front views of the embodiments of the furniture system 100.

Referring to the embodiment depicted in FIG. 3A, the vertical-height adjustment assembly 206 has been actuated to move the computer-peripheral section 106 to a relatively higher vertical displacement relative to the working surface. The arrow 228 indicates the direction of movement of the computer-peripheral section 106 (the vertical-height adjustment assembly 206 is released to depressurize pneumatic pressure thereby permitting the lowering of the computer-peripheral section 106).

Referring to the embodiment depicted in FIG. 3B, the computer-peripheral section 106 has been lowered (relative to the position depicted in FIG. 3A) with continued depressurization of the vertical-height adjustment assembly 206.

Referring to the embodiment depicted in FIG. 3C, the computer-peripheral section 106 has been lowered (relative to the position depicted in FIG. 3B) to the lowest vertical descent of the computer-peripheral section 106 (with continued depressurization of the vertical-height adjustment assembly 206).

Figure 4A:
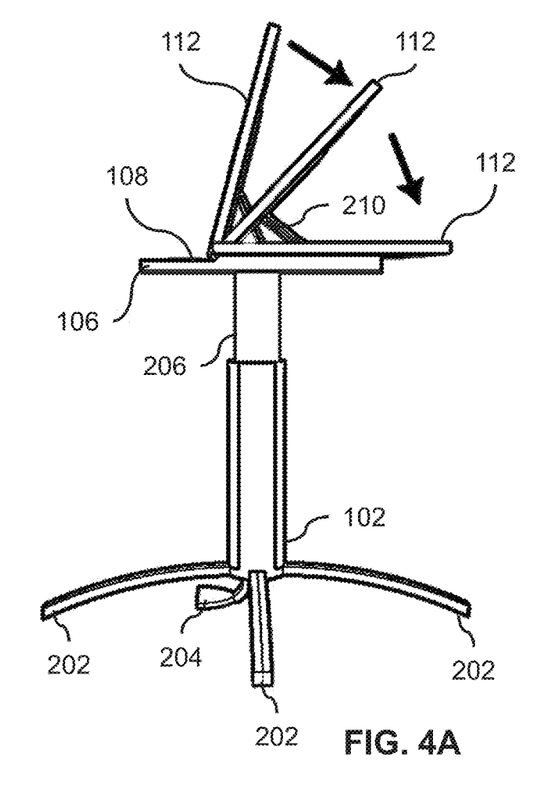
FIGS. 4A and 4B (SHEET 6 of 10 SHEETS) depict views of the embodiments of the furniture system of any one of FIGS. 1A, 1B, 1C, 1D, 1E and 1F.
Figure 4B:
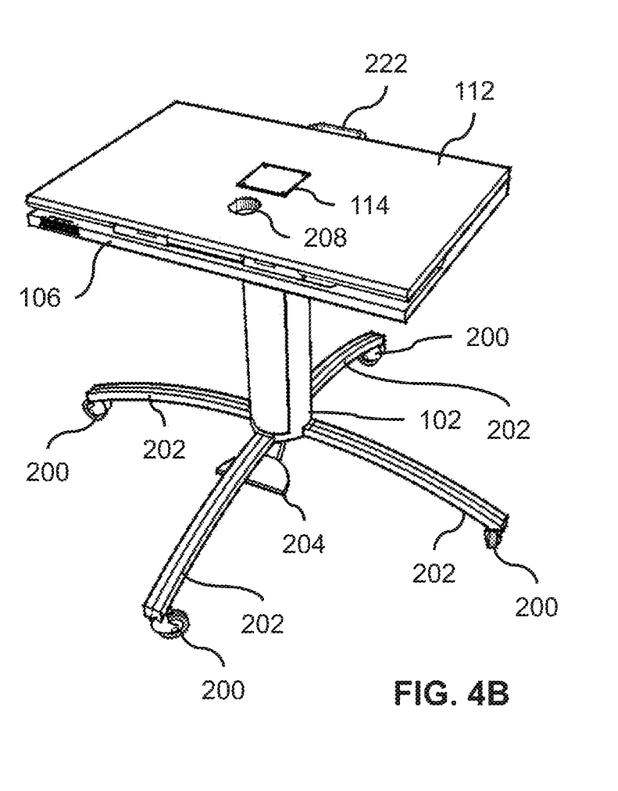

FIGS. 4A and 4B depict views of the embodiments of the furniture system 100 of any one of FIGS. 1A, 1B, 1C, 1D, 1E and 1F. FIG. 4A depicts a side view of an embodiment of the furniture system 100. FIG. 4B depicts a perspective view of an embodiment of the furniture system 100.

Referring to the embodiment depicted in FIG. 4A, the computer-support section 112 is pivotally connected to the computer-peripheral section 106 along a frontal edge section of the computer-peripheral section 106. There are three positions of the computer-support section 112 depicted in FIG. 4A to demonstrate the range of selectable positions in which the computer-support section 112 may be aligned at an angle relative to the computer-peripheral section 106. In the lowest pivoted position, the computer-support section 112 rests horizontally on the computer-peripheral section 106. The computer-peripheral section 106 is oriented to be horizontal (relative to the working surface). The base section 102 forms a central elongated column structure that extends vertically between the computer-peripheral section 106 and the working surface.

Referring to the embodiment depicted in FIG. 4B, the computer-support section 112 is configured to slide relative to the computer-peripheral section 106 (once the computer-support section 112 and the computer-peripheral section 106 are aligned horizontally adjacent to each other). This is done in such a way that the built-in computer-peripheral 108 becomes covered by a frontal portion of the computer-support section 112 (covered and not user-accessible).

Figure 5A:
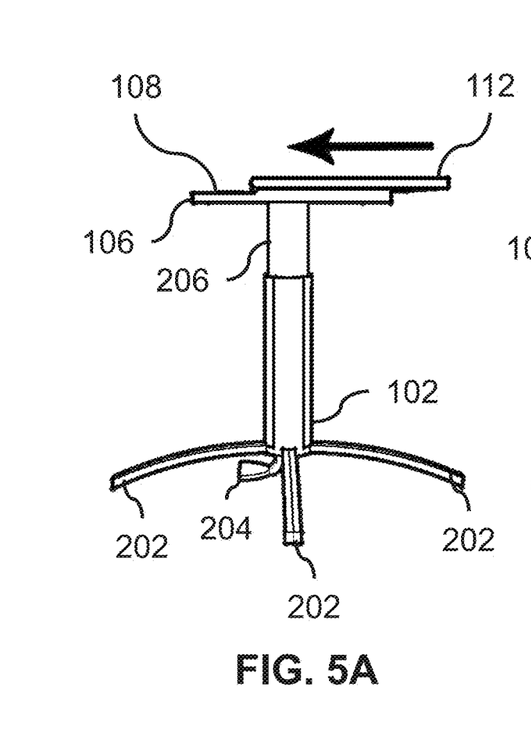
FIGS. 5A, 5B and 5C (SHEET 7 of 10 SHEETS) depict views of the embodiments of the furniture system of any one of FIGS. 1A, 1B, 1C, 1D, 1E and 1F.
Figure 5B:
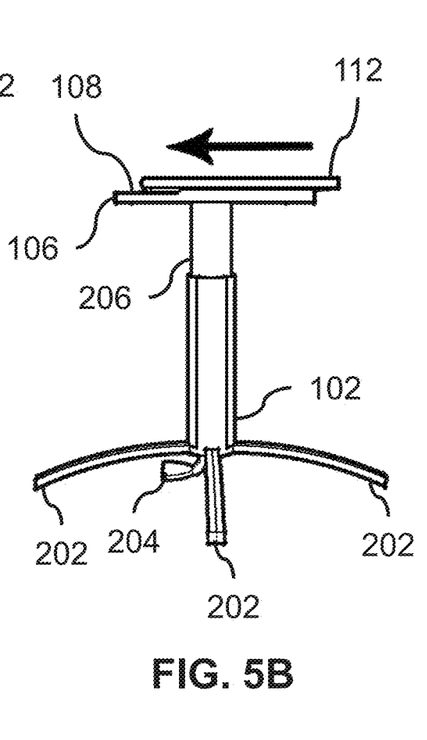
Figure 5C:
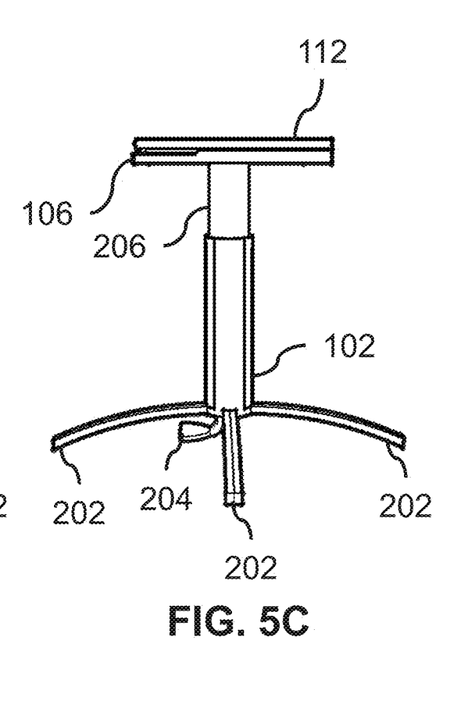

FIGS. 5A, 5B and 5C depict views of the embodiments of the furniture system 100 of any one of FIGS. 1A, 1B, 1C, 1D, 1E and 1F. FIGS. 5A, 5B and 5C depict side views of the embodiments of the furniture system 100.

Referring to the embodiment depicted in FIG. 5A, the computer-support section 112 is positioned horizontally adjacent to the computer-peripheral section 106 (in a side by side arrangement). The built-in computer-peripheral 108 is exposed as depicted in FIG. 5A.

Referring to the embodiment depicted in FIG. 5B, the computer-support section 112 is made to linearly slide (move) relative to the computer-peripheral section 106 in such a way that the built-in computer-peripheral 108 becomes covered (at least in part).

Referring to the embodiment depicted in FIG. 5B, the computer-peripheral section 106 and the computer-support section 112 are configured to be linearly slidable relative to each other once the computer-support section 112 is positioned in horizontal alignment with the computer-peripheral section 106. The computer-peripheral section 106 is mounted in a horizontal alignment (and remains in horizontal alignment). For instance, slide rails (known and not depicted) may be used to permit sliding movement between the computer-peripheral section 106 and the computer-support section 112 (if so desired). By way of example, FIGS. 1E and 7B depict spaced apart longitudinally-extending instances of a slide channel 230 formed on a back side of the computer-support section 112. The slide channel 230 is configured to allow the computer-support section 112 to slide forward and back (relative to the computer-peripheral section 106) once the computer-support section 112 is positioned in a horizontal alignment.

Referring to the embodiment depicted in FIG. 5C, the computer-support section 112 has been positioned so that the built-in computer-peripheral 108 is fully covered by the computer-support section 112.

FIGS. 6A and 6B depict views of the embodiments of the furniture system 100 of any one of FIGS. 1A, 1B, 1C, 1D, 1E and 1F. FIGS. 6A and 6B depict close-up perspective views of the embodiments of the furniture system 100.

Referring to the embodiment depicted in FIG. 6A, the base section 102 supports (provides) the built-in power cord 104. The built-in power cord 104 is extendable from the lower portion of the base section 102. The height-control assembly 204 is mounted to the lower portion of the computer-peripheral section 106. In accordance with a preferred embodiment, the built-in power cord 104 is configured for automatic recoil (retraction) for the case where the built-in power cord 104 is to be stored.

Referring to the embodiment depicted in FIG. 6B, the wheels 200 are mounted to the end portions of the legs 202. There are four instances of the legs 202 that extend radially from the lower portion of the base section 102.

Figure 7A:
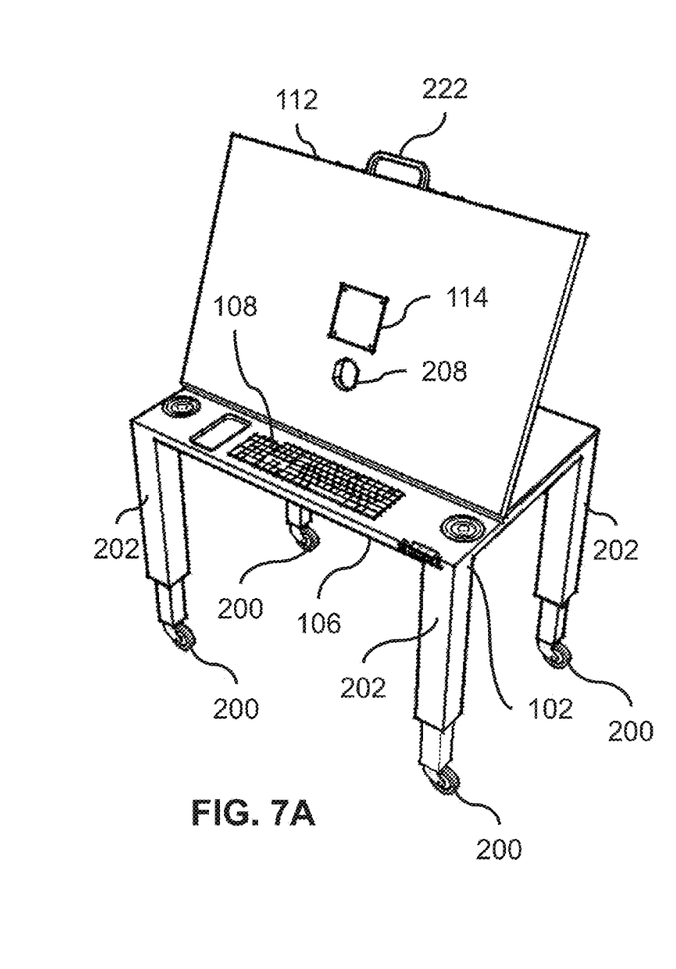
FIGS. 7A and 7B (SHEET 9 of 10 SHEETS) depict views of the embodiments of the furniture system of any one of FIGS. 1A, 1B, 1C, 1D, 1E and 1F.
Figure 7B:
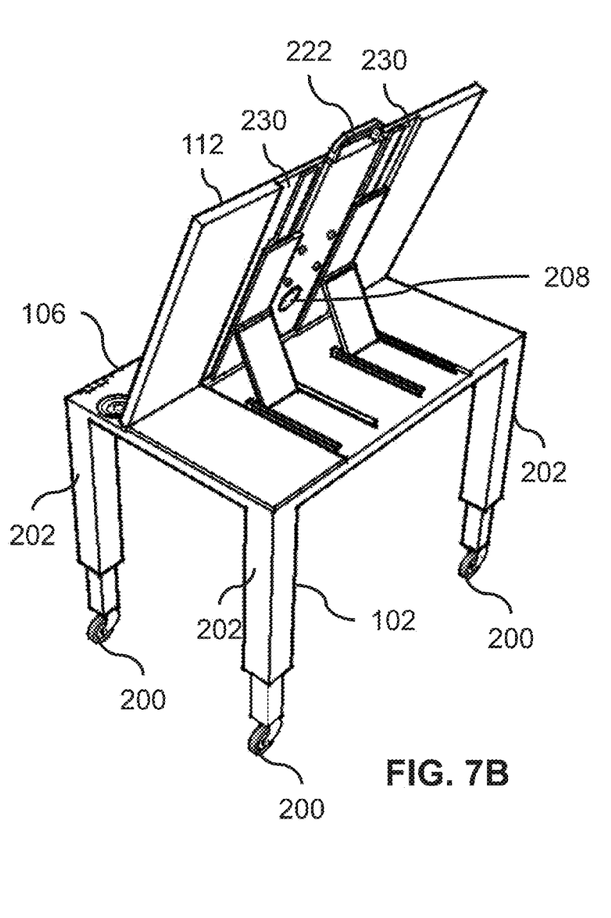

FIGS. 7A and 7B depict views of the embodiments of the furniture system 100 of any one of FIGS. 1A, 1B, 1C, 1D, 1E and 1F. FIGS. 7A and 7B depict perspective views of the embodiments of the furniture system 100.

FIG. 7A shows a frontal partial view and FIG. 7B provides a rear partial view. Referring to the embodiments depicted in FIGS. 7A and 7B, the base section 102 forms a rectangular shaped table having legs 202 extending from the corners of the table. The wheels 200 may be mounted to the lower portions of the legs 202. The legs 202 extend vertically.

Figure 8:
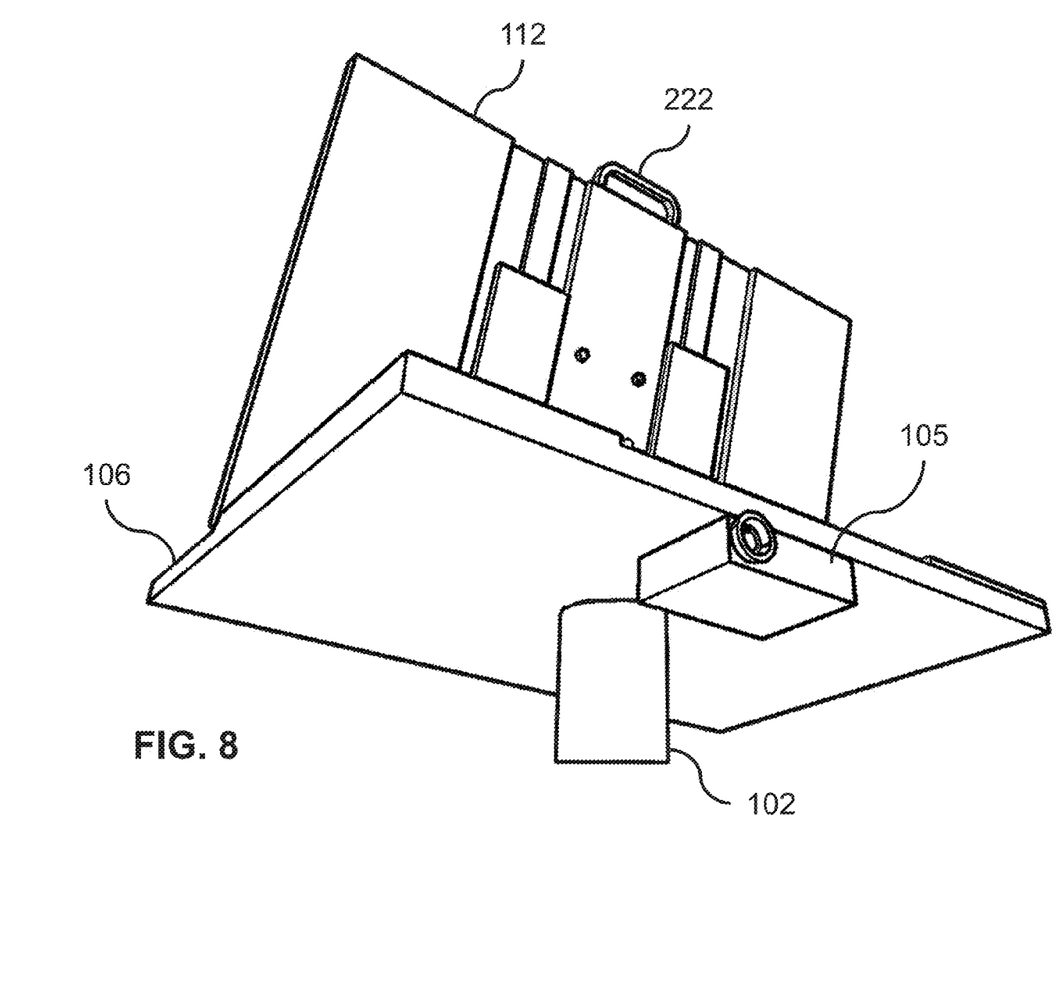
FIG. 8 (SHEET 10 of 10 SHEETS) depicts a view of an embodiment of the furniture system of any one of FIGS. 1A, 1B, 1C, 1D, 1E and 1F.

FIG. 8 depicts a view of an embodiment of the furniture system 100 of any one of FIGS. 1A, 1B, 1C, 1D, 1E and 1F.

In accordance with the embodiment depicted in FIG. 8, the furniture system 100 is adapted. The computer-peripheral section 106 is configured to support a projector assembly 105 (a visual projection device). The projector assembly 105 is configured to project an image onto a wall surface and any equivalent thereof. The projector assembly 105 may be operatively connected to the computer system 900 depicted in FIG. 1A. Preferably, the projector assembly 105 is mounted to a lower surface of the computer-peripheral section 106 and is positioned at a rear section of the computer-peripheral section 106. It will be appreciated that the projector assembly 105 may be mounted to the base section 102 (if so desired).

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A furniture system for a computer system having an integral display and for a user of the computer system, the furniture system comprising: a base section; a computer-peripheral section being configured to extend from the base section, and the computer-peripheral section presenting a built-in computer-peripheral having a built-in computer-peripheral wiring configured to operatively pass through an access port and interface with the computer system having the integral display; and a computer-support section being configured to present a fixedly-attached computer-mounting mechanism configured to couple with the computer system having the integral display on a front side in such a way that the integral display, in use, faces the user of the computer system, and a bottom edge of the computer-support section being hinge connected to the computer-peripheral section in such a way that the integral display of the computer system and the computer system removably positionable at selected user-display positions; and wherein: the computer-support section includes an angular-alignment control assembly configured to adjust alignment of the computer-support section relative to the computer-peripheral section in such a way that the computer-support section is adjustable to suit a viewing preference of the user when viewing the computer system; and the computer-peripheral section provides a guide mechanism configured to slide engage with the angular-alignment control assembly; and the computer-peripheral section defines slots that are spaced apart from each other from a rear portion of the computer-peripheral section extending toward a front portion of the computer-peripheral section; and the angular-alignment control assembly is configured to be received, at least in part, in at least one of the slots defined by the computer-peripheral section in such a way that an orientation of the computer-support section relative to the computer-peripheral section is adjustable by selective positioning of the angular-alignment control assembly in at least one of the slots; and the angular-alignment control assembly engages with at least one of the slots for ease of viewing of the computer-peripheral section; a slide channel formed on the computer-support section opposite to the front side to allow the computer-support section to slide forward and back once the computer-support section is positioned in a horizontal alignment.

2. A furniture system for a computer system having an integral display and for a user of the computer system, the furniture system comprising: a base section being configured to support a built-in power cord configured to provide power to the computer system having the integral display on a front side once the built-in power cord is operatively coupled to the computer system; a computer-peripheral section being configured to extend from the base section, and the computer-peripheral section presenting a built-in computer-peripheral having a built-in computer-peripheral wiring configured to operatively pass through an access port and interface with the computer system having the integral display once the built-in computer-peripheral wiring is operatively coupled to the computer system; and a computer-support section being configured to present a fixedly-attached computer-mounting mechanism configured to couple with, support and position the computer system having the integral display in such a way that the integral display of the computer system, in use, spatially faces away from the computer-support section and towards the user of the computer system having the integral display once the user is positioned to face the integral display of the computer system, and the computer-support section being movably coupled to the computer-peripheral section, and a bottom edge of the computer-support section being hinge connected to the computer-peripheral section in such a way that the integral display of the computer system and the computer system are movably positionable at selected user-display positions once the computer-support section is made to move relative to the computer-peripheral section; and wherein: the computer-support section includes an angular-alignment control assembly configured to adjust alignment of the computer-support section relative to the computer-peripheral section in such a way that the computer-support section is adjustable to suit a viewing preference of the user when viewing the computer system; and the computer-peripheral section provides a guide mechanism configured to slide engage with the angular-alignment control assembly; and the computer-peripheral section defines slots that are spaced apart from each other from a rear portion of the computer-peripheral section extending toward a front portion of the computer-peripheral section; and the angular-alignment control assembly is configured to be received, at least in part, in at least one of the slots defined by the computer-peripheral section in such a way that an orientation of the computer-support section relative to the computer-peripheral section is adjustable by selective positioning of the angular-alignment control assembly in at least one of the slots; and the angular-alignment control assembly engages with at least one of the slots for ease of viewing of the computer-peripheral section; a slide channel formed on the computer-support section opposite to the front side to allow the computer-support section to slide forward and back once the computer-support section is positioned in a horizontal alignment.

3. The furniture system of claim 2, wherein:
the base section includes:
legs extending from the base section, and the legs being configured to make direct contact with a working surface.

4. The furniture system of claim 2, wherein:
the base section includes:
legs extending from the base section, and
wheels being operatively mounted to the legs.

5. The furniture system of claim 2, wherein:
the built-in power cord is configured to retract when the built-in power cord is not required to be used to supply power to the computer system.

6. The furniture system of claim 2, wherein:
the fixedly-attached computer-mounting mechanism includes:
a VESA mount.

7. The furniture system of claim 2, wherein:
the base section includes:
a height-control assembly configured to actuate a vertical-height adjustment assembly, and the vertical-height adjustment assembly is operatively connected to the computer-peripheral section.

8. The furniture system of claim 2, wherein:
the computer-peripheral section provides, at least in part, a table top surface to the user.

9. The furniture system of claim 2, wherein:
the base section includes a central cylindrical support post positioned centrally underneath the computer-peripheral section.

10. The furniture system of claim 2, wherein:
the computer-peripheral section and the computer-support section are configured to provide user positioning options for spatial positioning of the computer system.

11. The furniture system of claim 2, wherein:
the computer-support section is configured to be spatially oriented relative to the user.

12. The furniture system of claim 2, wherein:
the computer-support section defines an access port configured to permit passage of the built-in computer-peripheral wiring through the computer-support section in such a way that the built-in computer-peripheral wiring is operatively connectable to the computer system mountable to the fixedly-attached computer-mounting mechanism.

13. The furniture system of claim 2, wherein:
the computer-support section defines an access port configured to permit passage of the built-in power cord and the built-in computer-peripheral wiring.

14. The furniture system of claim 2, wherein:
the computer-peripheral section and the computer-support section are positioned above the base section in a form of a two-piece table top arrangement.

15. The furniture system of claim 2, wherein:
the computer-peripheral section includes:
a light-transmittable material configured to face the user and configured to provide, at least in part, a visual view of the built-in computer-peripheral.

16. The furniture system of claim 2, wherein:
the built-in computer-peripheral includes any one of:
a keyboard, a speaker system, a mouse track pad, a wireless charging plate, a touch pad, an HDMI input port, standard audio jacks for headphones and a microphone, a USB port, a micro-USB port, a card reader and a memory interface device.

17. The furniture system of claim 2, wherein:
the computer-support section is pivotally connected to the computer-peripheral section along a frontal edge section of the computer-peripheral section.

18. The furniture system of claim 2, wherein:
the computer-support section is configured to slide relative to the computer-peripheral section once the computer-support section and the computer-peripheral section are aligned horizontally adjacent to each other in such a way that the built-in computer-peripheral becomes covered, at least in part, by a frontal portion of the computer-support section.

19. The furniture system of claim 2, wherein:
the computer-support section is positionable horizontally adjacent to the computer-peripheral section in a side by side arrangement.

\* \* \* \* \*